INVENTOR.
HIROSHI YONEMOTO
BY KOUICHI KAWAKYU
Louis H. Eslinger

March 20, 1973 HIROSHI YONEMOTO ET AL 3,721,774

MAGNETIC RECORDING AND/OR REPRODUCING APPARATUS WITH SIGNAL MUTING DURING CHANGE OF OPERATIVE CONDITION

Filed May 14, 1971 3 Sheets-Sheet 2

INVENTORS
HIROSHI YONEMOTO
KOUICHI KAWAKYU
BY
[signature]
ATTORNEY

INVENTOR.
HIROSHI YONEMOTO
KOUICHI KAWAKYU
BY Lewis H. Eslinger

United States Patent Office 3,721,774
Patented Mar. 20, 1973

3,721,774

MAGNETIC RECORDING AND/OR REPRODUCING APPARATUS WITH SIGNAL MUTING DURING CHANGE OF OPERATIVE CONDITION

Hiroshi Yonemoto, Urawa-shi, Saitama-ken, and Koichi Kawakyu, Tokyo, Japan, assignors to Sony Corporation, Tokyo, Japan Filed May 14, 1971, Ser. No. 143,483
Claims priority, application Japan, May 21, 1970 (utility model), 45/49,631
Int. Cl. G11b *15/18, 21/08*
U.S. Cl. 179—100.2 MD 15 Claims

ABSTRACT OF THE DISCLOSURE

In a magnetic recording and/or reproducing apparatus capable of reproducing signals recorded on a magnetic tape during movement of the tape in both forward and reverse directions, at least two magnetic heads pick up the signals from the tape and independent signal transmitting lines are provided for transmitting the signals from the corresponding magnetic heads to a common output terminal, such signal transmitting lines having switching means for muting the signals during changing of the operative condition of the apparatus and also for selecting the signal or signals to be reproducing during movement of the tape in the forward or reverse direction.

This invention relates generally to magnetic recording and/or reproducing aparatus in which signals are recorded on a magnetic tape, and more particularly to such apparatus in which signals recorded on the magnetic tape are reproduced during movement of the tape in both forward and reverse directions.

Tape recording and/or reproducing apparatus is usually provided with a switch assembly by which the tape drive is conditioned for a selected one of various operating conditions, such as, normal forwarding for recording or reproducing, fast forwarding, rewinding, stop and the like. The operation of the change-over switch assembly produces a clicking noise, which disturbs the recording or reproducing of the signal. To avoid this, it has been proposed to provide a muting circuit which interrupts the supplying of the recorded signal to a recording magnetic head, or of the signal reproduced by a reproducing magnetic head to an output terminal, during operation of the change-over switch assembly, and thereby prevents the inclusion of the mentioned clicking noise in the recorded or reproduced signal.

A tape recording and/or reproducing apparatus is also known in which signals are recorded in a plurality of tracks on the tape, and such signals are reproduced from the respective tracks during driving of the tape in the forward and reverse directions, respectively, with the direction of drive of the tape being determined by a change-over switch assembly which is operated manually or automatically, for example, in response to reaching the end of one of the tracks. In a typical arrangement of this type, signals are recorded in first and second tracks of the tape which is driven in one direction during reproduction of the signal recorded in the first track and, upon completion thereof, the change-over switch assembly is operated to reverse the direction in which the tape is driven for reproduction of the signal recorded in its second track. Usually, individual magnetic heads are provided for the two tracks and only the signal picked up by one of the magnetic heads is obtained during movement of the tape in each direction. For example, during forward movement of the tape, only the signal from the magnetic head making contact with the first track is picked up, and during driving of the tape in the reverse direction, only the signal from the head in contact with the second track is picked up.

Existing tape recording and/or reproducing apparatus combining the above functions, that is, capable of recording and/or reproducing from at least two tracks during driving of the tape in the reverse and forward directions, respectively, have relatively complex structures therefor, particularly when the apparatus is also required to be capable of stereophonic recording and/or reproducing during which both heads are simultaneously operative to record and/or reproduce signals in two respective tracks on the tape.

One object of this invention is to provide an improved magnetic tape recording and/or reproducing apparatus which is capable of reproducing signals from a magnetic tape during movement of the tape in both forward and reverse directions.

Another object is to provide an apparatus, as aforesaid, with means for simply controlling the magnetic head or heads from which signals are extracted or transmitted during driving of the tape in the forward and reverse direction, and further for muting such signals during change-over of the operating condition of the apparatus so that an undesirable clicking noise does not appear in the output by reason of the change-over.

Still another object is to provide an apparatus, as aforesaid, which is operative for monophonic recording and/or reproducing from a plurality of tape tracks during driving of the tape in forward or reverse directions, or for stereophonic recording and/or reproducing during driving of the tape in one of those directions.

In accordance with an aspect of the invention, a magnetic tape recording and/or reproducing apparatus is provided with at least first and second magnetic heads for picking up signals from respective tracks of the tape, first and second signal transmitting lines for transmitting the signals from the first and second heads, respectively, to a signal output terminal, first and second switch means connected with the first and second transmitting lines to control the transmission of signals through the respective lines, and control means for selectively actuating the first and second switch means in response to movement of the tape in the forward and reverse directions, respectively. Further, apparatus according to the invention preferably has means to actuate both of the said switch means during change-over of the operating conditions of the apparatus.

It is a feature of the invention, that the above mentioned first and second switch means are in the form of transistors which are turned on to short circuit the respective transmitting line either during change-over of the operating condition or during reproducing of the signal picked-up by the head associated with the other transmitting line.

The above, and other objects, features and advantages of this invention, will become apparent from the following detailed description which is to be read in conjunction with the accompanying drawings in which.

Figure 1:
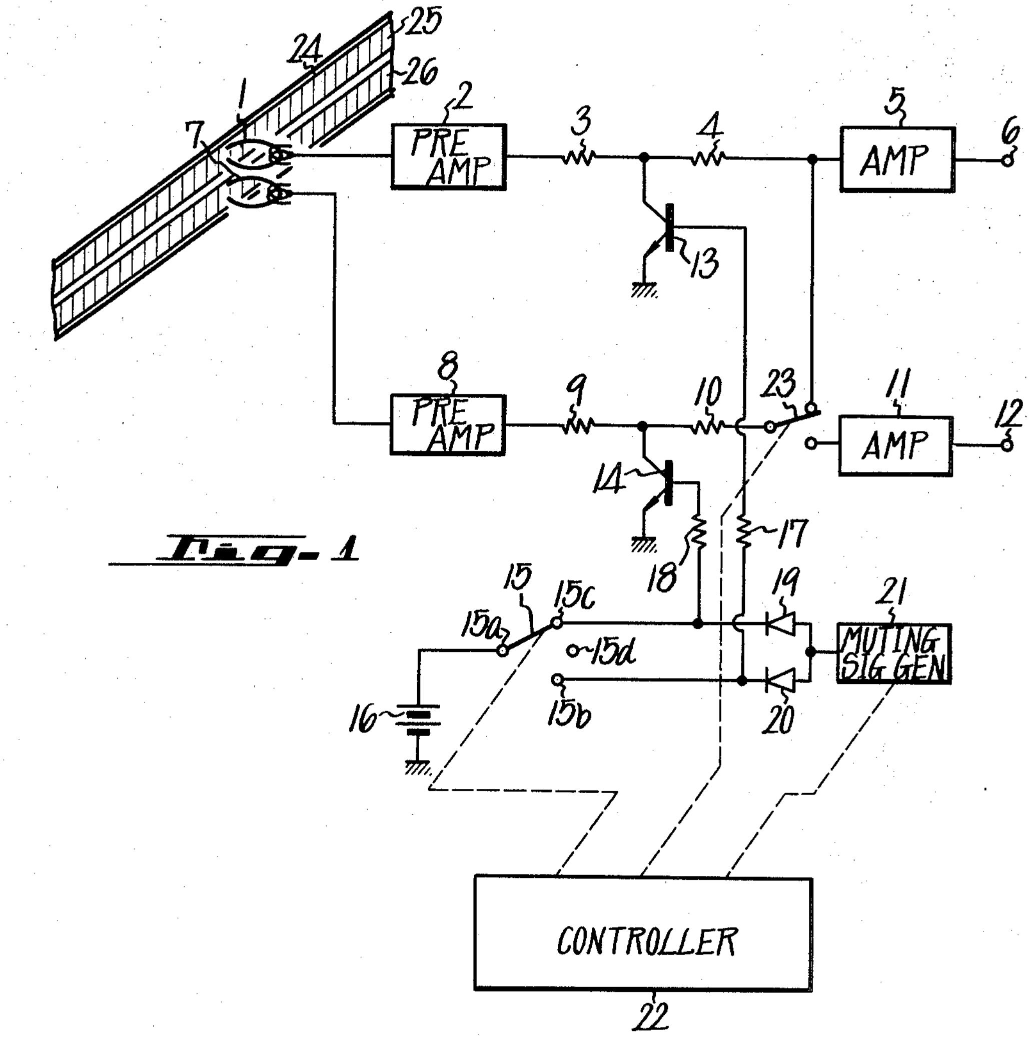
FIG. 1 is a schematic diagram showing one example of a magnetic tape recording and/or reproducing apparatus according to this invention.
Figure 1A:
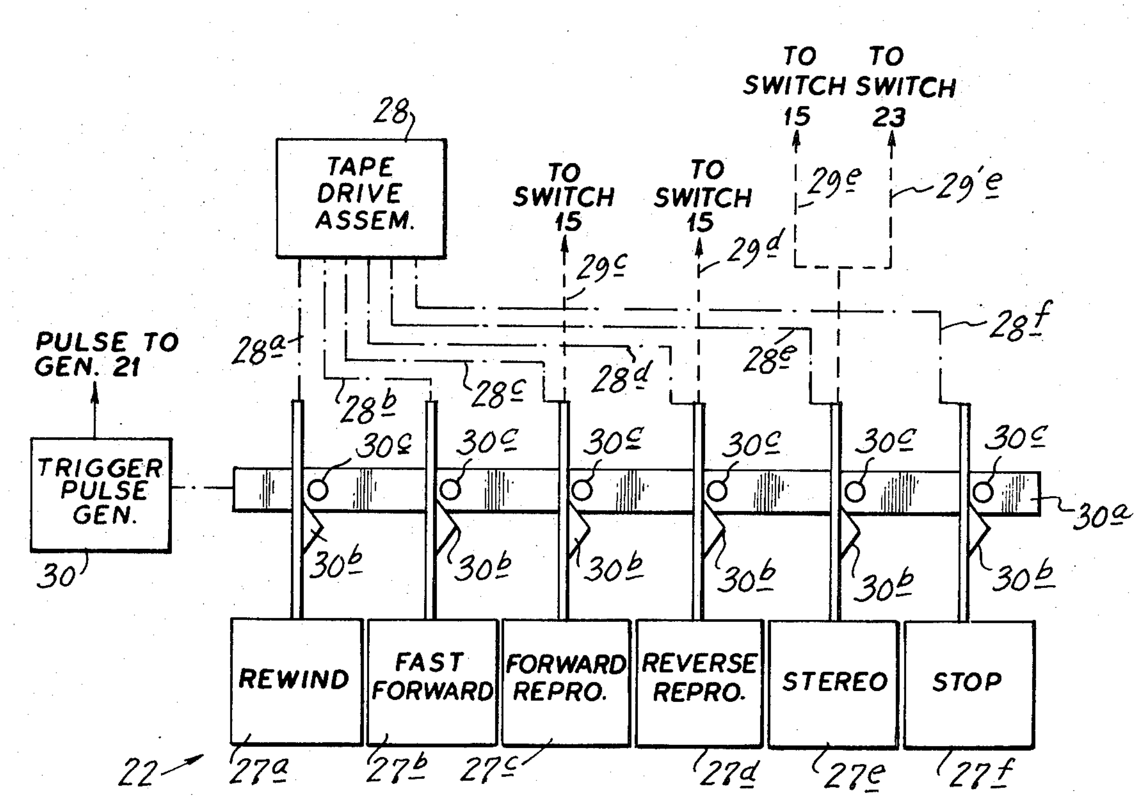
FIG. 1A is a schematic diagram showing in greater detail the arrangement of a controller included in the apparatus of FIG. 1.

Referring to the drawings in detail, and initially to FIGS. 1 and 1A thereof, it will be seen that, in the apparatus shown in FIG. 1, two tracks 25 and 26 are formed on a magnetic tape 24 and signals are reproduced from the tracks 25 and 26 alternatively during tape motion in the forward and reverse directions, or stereophonic signals are reproduced from both tracks simultaneously while the tape is driven in one direction. The apparatus is shown to have a reproducing magnetic head 1 which is used during the forward movement of magnetic tape 24 and makes contact with the tracks 25 on the tape. An output signal of the reproducing magnetic head 1 is supplied to a main amplifier 5 through a preamplifier 2 and resistors 3 and 4. The output side of the main amplifier 5 is connected to an output terminal 6 for connection with a speaker or the like (not shown). A second reproducing magnetic head 7, which is used during the reverse movement of the magnetic tape 24, makes contact with the second track 26 on the tape. An output signal of the reproducing magnetic head 7 is adapted to be supplied to amplifier 5 through a preamplifier 8, resistors 9 and 10 and a switch 23 when the latter switch is in the position shown. However, when switch 23 is actuated, for example, to engage the contact **23*a* thereof during stereophonic reproduction as hereinafter described, the output signal from head 7 is then supplied through preamplifier 8, resistors 9 and 10 and switch 23 to another main amplifier 11 having its output side connected to another output terminal 12** which is adapted for connection to a respective speaker or the like (not shown).

In accordance with the present invention, the connection point between resistors 3 and 4 is connected to the collector of an NPN-type transistor 13 and the connection point between resistors 9 and 10 is similarly connected to the collector of an NPN-type transistor 14, and the emitters of the transistors 13 and 14 are grounded. Thus, when either of the transistors 13 and 14 is made conductive or turned on, it forms a short-circuit path for the signal from the respective head 1 or 7. In the embodiment shown, the selective turning-on of transistors 13 and 14 is controlled by a switch 15 having a movable contact **15*a* connected to the positive electrode of a DC power source 16 which has its negative electrode grounded. The power source voltage is selected so as to be high enough to turn on the selected transistor when applied to the gate of the latter. The switch 15 further has a fixed contact 15*b* connected to the base of transistor 13 through a resistor 17, another fixed contact 15*c* connected to the base of the transistor 14 through a resistor 18, and a fixed contact 15*d* which is open. The switch 15 is operated by a controller 22, as hereinafter described, so as to selectively engage its contact 15*a* with one of the contacts 15*b*, 15*c* or 15*d*** in dependence upon the operating condition of the apparatus selected by means of the controller.

The controller 22 may be of conventional construction and, as shown schematicaly on FIG. 1A, may include push-buttons **27*a*–27*f* which are selectively depressed to respectively cause rewind operation, fast forward operation, reproduction with the tape driven in the forward direction, reproduction with the tape driven in the reverse direction, stereo reproduction, and stopping. Suitable conventional mechanical or electrical connections 28*a*–28*f* extend from the push-buttons 27*a*–27*f*, respectively, to a tape drive assembly 28 to suitably control both the speed and direction of drive of the tape by such assembly 28. Further, mechanical or electrical connections 29*c*, 29*d* and 29*e* extend from push buttons 27*c*, 27*d* and 27*e* to switch 15 so that movable contact 15*a* of that switch engages its fixed contacts 15*b*, 15*c* and 15*d* upon the selective depression of buttons 27*d*, 27*c* and 27*e*, respectively. An additional mechanical or electrical connection 29'*e* is shown to extend from push-button 27*e* for actuating switch 23 so that the latter engages its contact 23*a* only when push-button 27*e*** is depressed for obtaining stereo-reproduction.

In the embodiment of the invention being described, the fixed contacts **15*b* and 15*c* of change-over switch 15 are also respectively connected to the cathodes of diodes 19 and 20 which have their anodes interconnected, and the connection point between the anodes is connected to a muting signal generator circuit 21. The muting signal generator circuit 21 includes, for example, a monostable multivibrator, which is adpated to operate in response to actuation of the controller 22, that is, when the apparatus has been changed over by the controller 22 to its forward reproducing, reverse reproducing, fast forwarding, rewinding or stop condition. The operation of the monostable multivibrator incorporated in the muting signal generator circuit 21 may be initiated by a trigger pulse from a trigger pulse generator 30 (FIG. 1A) to reverse the operation of the monostable multivibrator, thus supplying a positive voltage to the diodes 19 and 20 for a time dependent upon the time constant of the monostable multivibrator. The time constant of the monostable multivibrator is selected to exceed the time required for changing over the operative condition of the apparatus by the controller 22. As shown by way of example on FIG. 1A, the trigger pulse generator 30 may be operated to trigger the muting signal generator 21 whenever a rod 30*a* is displaced, for example to the right as viewed on FIG. 1A, and such displacement of the rod 30*a* is produced in response to depression of any of the push-buttons 27*a*–27*f* by the engagement of a related cam 30*b* on each push-button with a follower pin 30*c* on rod 30*a***.

With the construction above described, and assuming that button **27*c* has been depressed to cause reproduction during movement of the tape in the forward direction, the movable contact 15*a* of the change-over switch 15 is then engaged with the fixed contact 15*c* and, accordingly, a positive voltage is supplied to the base of transistor 14 to turn the latter on, and thereby establish a short circuit to ground from the connection point of the resistors 9 and 10. Therefore, the output signal of the preamplifier 8 is not supplied to the main amplifier 5. Further, in this case, the voltage from source 16 is not applied to the base of transistor 13, and consequently the transistor 13 remains in the off state. Consequently, only the reproduced signal from the reproducing magnetic head 1 is passed to amplifier 5 and derived at the output terminal 6**.

In the case of reproduction during movement of the tape in the reverse direction, the push-button **27*d* of controller 22 is depressed, and in consequence thereof, the movable contact 15*a* of change-over switch 15 is engaged with the fixed contact 15*b*. Accordingly, a positive voltage is applied to the base of transistor 13 to turn it on, whereby the connection point of the resistors 3 and 4 is grounded, so that the output signal from the preamplifier 2 is not supplied to the main amplifier 5. In this case, the voltage from source 16 is not applied to the base of the transistor 14, and consequently the transistor 14 is in the off state. Further, since the switch 23 remains in the illustrated condition in the case of reproduction from one track during movement of the tape in both the forward and reverse directions, the reproduced signal from the reproducing magnetic head 1 or the head 7 is derived at the output terminal 6, and no output appears at the terminal 12**.

When the operating condition of the apparatus is changed, for example, from the condition for reproduction with movement of the tape in the forward or reverse direction to the fast forwarding or rewinding condition, the transistors 13 and 14 are both rendered conductive or turned on by a muting signal from the muting signal generator circuit 21 for the time necessary for the changeover, and during which time the output sides of the preamplifiers 2 and 8 are grounded. As a result of this, no signal is transmitted to the output terminal 6 and no click noise is generated at the time of changeover of the operative condition of the apparatus.

In accordance with this invention, the signals that are reproduced from the tape while being driven in the forward or reverse direction are selected merely by selectively switching on and off the transistors or other semiconductor switching elements provided in the signal system and, in addition, muting is also achieved merely by switching on the same transistors for avoiding the click noise disturbance produced when the operative condition of the apparatus is changed by the operation of the controller. Accordingly, the overall construction of the apparatus is greatly simplified.

When the apparatus is changed over by the actuation of push-button 27*e* of controller 22 to the condition for the stereophonic reproduction of signals from both tracks simultaneously during tape movement in the forward direction, switch 23 is actuated to close its contact 23*a* and the movable contact 15*a* of the changeover switch 15 is engaged with the fixed contact 15*d*. Accordingly, the bases of transistors 13 and 14 are not supplied with DC voltage from the power source 16, so that the transistors 13 and 14 are both in the off state and the signals in the two tracks 25 and 26 on the tape 24 are simultaneously transmitted to the output terminals 6 and 12, respectively, thus achieving stereophonic reproduction. Also in this case, the muting signal is applied to the bases of transistors 13 and 14 during changeover of the operative condition of the apparatus by the controller, thereby avoiding the click noise disturbance.

Figure 2:
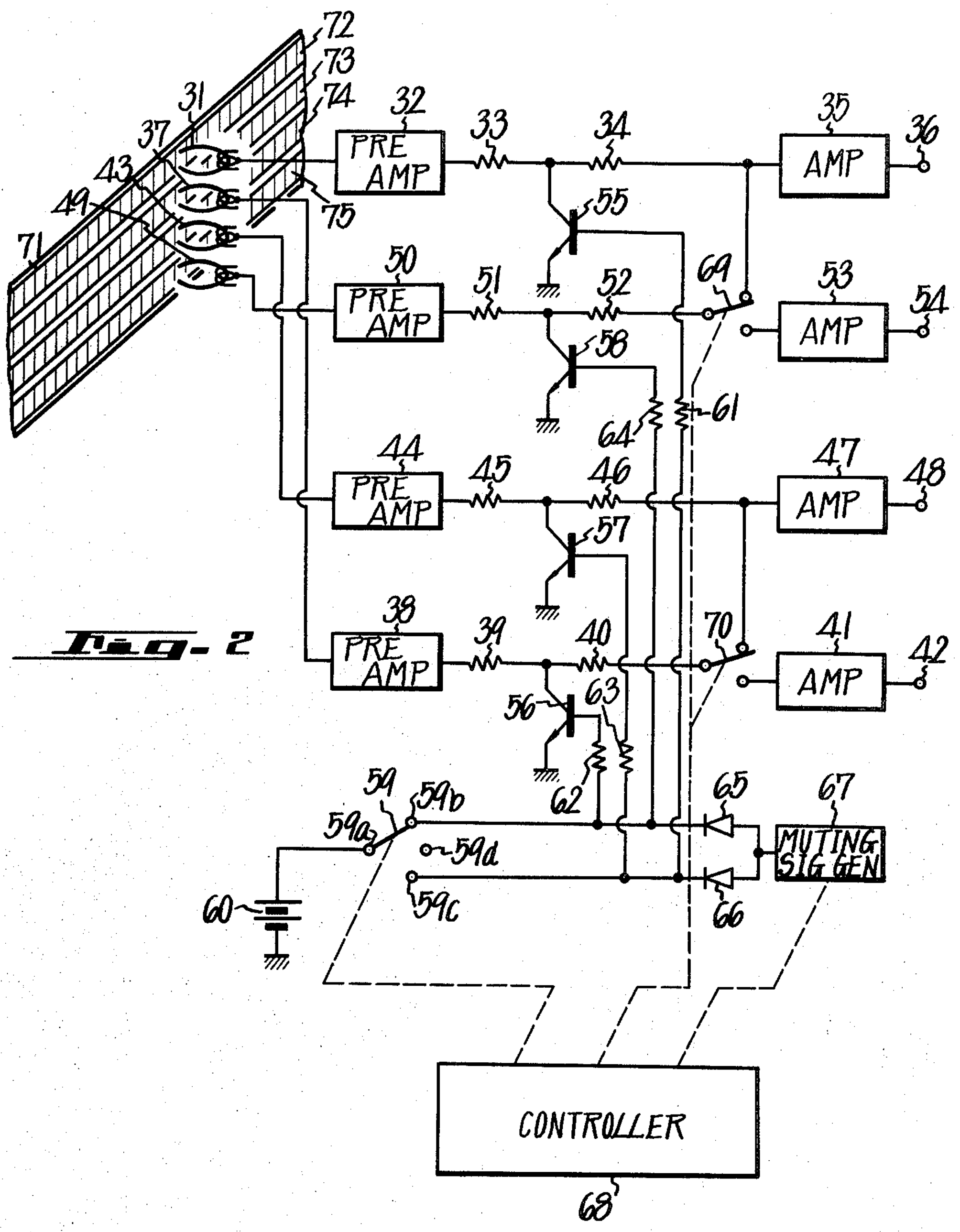
FIG. 2 is a schematic diagram illustrating a modified form of magnetic tape recording and/or reproducing apparatus according to this invention.

FIG. 2 illustrates another embodiment of this invention in which signals from two tracks are reproduced simultaneously during movement of the tape in both the forward and reverse directions, thereby to achieve stereophonic reproduction. This embodiment is also capable of simultaneously reproducing signals from four tracks during movement of the tape in the forward direction, as is the case in 4-channel stereophonic or quadriphonic reproduction.

In the illustrated example, reference numerals 31 and 43 indicate reproducing magnetic heads which are used when a magentic tape 71 is driven in the forward direction and which respectively make contact with first and third tracks 72 and 74 on the magnetic tape 71. Output signals from the reproducing magnetic heads 31 and 43 are supplied to main amplifiers 35 and 47 through preamplifiers 32 and 44 and resistors 33, 34 and 45, 46, respectively. The output sides of the main amplifiers 35 and 47 are respectively connected to output terminals 36 and 48 which are adapted to be connected to speakers (not shown). Reference numerals 37 and 49 indicate reproducing magnetic heads which are used when the magnetic tape 71 is driven in the reverse direction and which respectively make contact with second and fourth tracks 73 and 75 on the magnetic tape 71. Output signals from the reproducing magnetic heads 37 and 59 are adapted to be supplied to additional main amplifiers 41 and 53 through preamplifiers 38 and 50, resistors 39, 40 and 51, 52 and switches 70 and 69, respectively. The output sides of additional amplifiers 41 and 53 are connected to output terminals 42 and 54, respectively, which are adapted for connection to respective speakers (not shown).

In accordance with the present invention, the connection point between the resistors 33 and 34 is connected to the collector of an NPN-type transistor 55, the connection point between the resistors 45 and 46 is connected to the collector of an NPN-type transistor 57, the connection point between the resistors 39 and 40 is connected to the collector of an NPN-type transistor 56, the connection point between the resistors 51 and 52 is connected to the collector of an NPN-type transistor 58, and the emitters of the transistors 55 to 58 are all grounded.

Reference numeral 59 indicates a change-over switch having a movable contact 59*a* connected to the positive electrode of a DC power source 60 which has its negative electrode grounded. The voltage of poser source 60 is made high enough to turn on the transistors when applied to the bases thereof. A fixed contact 59*c* of switch 59 is connected to the bases of transistors 55 and 57 through resistors 61 and 63, respectively, and another fixed contact 59*b* is connected to the bases of transistors 56 and 58 through resistors 62 and 64, respectively.

Further, the fixed contacts 59*b* and 59*c* of the change-over switch are respectively connected to the cathodes of diodes 65 and 66, and the anodes of such diodes are interconnected with the connection point therebetween being connected to a muting signal generator circuit 67. The change-over switch 59, the switches 69 and 70, the muting signal generator circuit 67 and a controller 68 may be similar to corresponding elements employed in the example of FIG. 1. The switches 69 and 70 are shown in the condition for stereophonic reproduction from two tracks during movement of the tape in both the forward and reverse directions. For the condition of quadriphonic reproduction from all four tracks during tape movement in one direction, switches 69 and 70 are actuated to close their contacts 69*a* and 70*a*.

With the construction above described, in the case of reproduction during movement of the tape in the forward direction, the movable contact 59*a* of change-over switch 59 is engaged with the fixed contact 59*b* by the operation of the controller 68. Accordingly, a positive voltage is supplied to the bases of transistors 56 and 58 to turn them on, with the result that the connection points between resistors 39 and 40 and between resistors 51 and 52 are grounded so that the output signals of preamplifiers 38 and 50 are not supplied to the additional main amplifiers 41 and 53. Further, in this case, the voltage from source 60 is not applied to the bases of transistors 55 and 57, and consequently the transistors 55 and 57 are in the off state. Therefore, only the signals from the reproducing magnetic heads 31 and 43, that is, only the signals recorded on the first and third tracks 72 and 74, are derived at the output terminals 36 and 48, respectively.

In the case of reproduction during movement of the tape in the reverse direction, the controller 68 causes the movable contact 59*a* of the change-over switch to engage the fixed contact 59*c*. Accordingly, a positive voltage is supplied to the bases of transistors 55 and 57 to turn them on, with the result that the connection points between resistors 33 and 34 and between resistors 45 and 46 are grounded, so that the output signals from the preamplifiers 32 and 44 are not supplied to the main amplifiers 35 and 47. In this case, the voltage from source 60 is not applied to the bases of transistors 56 and 58, and consequently the transistors 56 and 58 are in the off state. Accordingly, only the signals from the reproducing magnetic heads 37 and 49, that is, only the signals recorded on the second and fourth tracks 73 and 75, are derived at the output terminals 36 and 48, respectively.

Whenever the apparatus is changed over from one of its operating conditions to another, for example, from the condition for reproduction during tape motion in the forward or reverse direction to the fast forwarding or rewinding condition, the transistors 55 to 58 are rendered conductive or turned on by a muting signal from the muting signal generator circuit 67 for the time necessary for the change-over, during which time the output sides of the preamplifiers 32, 38, 44 and 50 are all grounded. As a result, no click noise is generated at the time of change-over of the operating condition of the apparatus.

When the apparatus is conditioned by the controller 68 for 4-channel stereophonic or quadriphonic signal reproduction, the switches 69 and 70 are actuated by the controller 68 to close their contacts 69*a* and 70*a* and the moving contact 59*a* of the switch 59 is engaged with the fixed contact 59*d*. Accordingly, DC voltage is not supplied to the bases of transistors 55 to 58 from power source 60 and these transistors are rendered non-conductive or turned off. Thus, the signals from the reproducing magnetic heads 31, 37, 43 and 49 are respectively supplied to the main amplifiers 35, 41, 47 and 53 and then transmitted to the output terminals 36, 42, 48 and 54, for providing the 4-channel streophonic or quadriphonic signal reproduction. As before, the click noise is prevented by the described muting effect when the apparatus is changed over to or from the condition for quadriphonic reproduction.

As has been described in the foregoing, the present invention makes it possible to attain only the desired signals at output terminals merely by changing over the states of transistors, that is, by turning on and off semiconductor switching elements, so that the invention greatly simplifies the construction of the magnetic tape recording and/or reproducing apparatus and greatly reduces the susceptibility of the apparatus to failures.

Further the described embodiments are advantageous in that no click noise is produced when the magnetic recording and/or reproducing apparatus is changed over from one operating condition to another, and this function is performed by the same semiconductor switching elements that are employed for selecting the reproduced signals.

Although NPN-type transistors are used as the semiconductor switching elements in the foregoing examples, it is possible, of course, to replace them with semiconductor elements such as PNP-type transistors, FET's, SCR's or the like.

Although illustrative embodiments of the invention have been described in detail herein with reference to the accompanying drawings, it is to be understood that the invention is not limited to those embodiments, and that various changes and modifications may be effected therein by one skilled in the art without departing from the scope or spirit of the invention.

What is claimed is:

1. A magnetic recording and/or reproducing apparatus capable of reproducing signals recorded on a magnetic tape during movement of the tape in both forward and reverse directions, said apparatus comprising:

(a) at least first and second magnetic heads for picking up signals from the tape, (b) a signal output terminal, (c) first signal transmitting line means for transmitting the signal from said first head to said output terminal, (d) second signal transmitting line means for transmitting the signal from said second magnetic head to said ouput terminal, (e) first and second switch means connected to said first and second signal transmitting line means, respectively, and being actuable to control the transmission of the signal by the respective line means, (f) first control means for selectively actuating said first and second switch means in response to movement of the tape in the forward and reverse directions, respectively, and (g) second control means for actuating said first and second switch means simultaneously so as to mute the signals in both of said first and second signal transmitting line means for a predetermined period of time during changing of the operative condition of the apparatus.

2. A magnetic recording and/or reproducing apparatus as in claim 1, in which said first and second magnetic heads pick up signals from respectively different tracks on the tape.

3. A magnetic recording and/or reproducing apparatus as in claim 2, in which each of said first and second signal transmitting line means includes a preamplifier for amplifying the signal from each of said first and second magnetic heads.

4. A magnetic recording and/or reproducing apparatus as in claim 3, in which said first and second signal transmitting line means are connected to said output terminal through a common main amplifier.

5. A magnetic recording and/or reproducing apparatus as in claim 4, which further includes an additional main amplifier and an additional output terminal connected thereto, said additional main amplifier being selectively connected to one of said first and second signal transmitting line means.

6. A magnetic recording and/or reproducing apparatus as in claim 1, in which said first and second switch means are transistors connected between said first and second signal transmitting line means and ground, each of said transistors forming a short circuit path for the respective signal when actuated by said control means.

7. A magnetic recording and/or reproducing apparatus as in claim 6, in which said first control means comprises a DC voltage source and a control switch for applying therethrough a DC voltage from said DC voltage source selectively to said transistors so that the selected transistor is turned on to form said short circuit path.

8. A magnetic recording and/or reproducing apparatus as in claim 7, in which said control switch operates to apply said DC voltage to a transistor of said first switch means during movement of the tape in a forward direction and to a transistor of said second switch means during movement of the tape in the reverse direction.

9. A magnetic recording and/or reproducing apparatus as in claim 6, in which said second control means includes a muting signal generator for producing a muting signal to turn on both of said transistors during changing of the operative condition of the apparatus.

10. A magnetic recording and/or reproducing apparatus as in claim 9, in which connecting means connect one of the electrodes of each of said transistors to the corresponding electrode of the other transistor and said muting signal is applied to said connecting means.

11. A magnetic recording and/or reproducing apparatus as in claim 1, which further comprises third and fourth magnetic heads for picking up signals from the tape, third and fourth signal transmitting line means connected to a second signal output terminal for respectively transmitting the signals from said third and fourth heads to said second output terminal, and third and fourth switch means connected to said third and fourth signal transmitting line means, said third and fourth switch means being controlled by said first and second control means simultaneously with said first and second switch means, respectively.

12. A magnetic recording and/or reproducing apparatus as in claim 11, in which said third and fourth magnetic heads pick up signals from different additional tracks recorded on the magnetic tape.

13. A magnetic recording and/or reproducing apparatus as in claim 12, in which said third and fourth signal transmitting line means are connected to said second output terminal through a second common main amplifier.

14. A magnetic recording and/or reproducing apparatus as in claim 11, in which each of said third and fourth signal transmitting line means includes a preamplifier.

15. A magnetic recording and/or reproducing apparatus as in claim 14, in which a second additional main amplifier and a second additional output terminal are provided, said second additional amplifier being selectively connected to one of said third and fourth signal transmitting line means.

References Cited

UNITED STATES PATENTS

| | | | |
|---|---|---|---|
| 3,573,393 | 4/1971 | Blackie | 179—100.2 MD |
| 3,461,249 | 8/1969 | Kamoji et al. | 179—100.2 MD |
| 3,281,542 | 10/1966 | Corley | 179—100.1 VC |
| 3,316,358 | 4/1967 | Guisinger | 307—247 R |
| 3,582,949 | 6/1971 | Forst | 179—100.2 MD |
| 3,596,378 | 8/1971 | Flubacker | 179—100.1 VC |

BERNARD KONICK, Primary Examiner
A. H. EDDLEMAN, Assistant Examiner

U.S. Cl. X.R.

179—100.1 VC, 100.2 S